United States Patent
Carnahan

(10) Patent No.: US 7,705,056 B1
(45) Date of Patent: Apr. 27, 2010

(54) AEROSOL ADHESIVE AND CANISTER-BASED AEROSOL ADHESIVE SYSTEM

(75) Inventor: David W. Carnahan, Bremerton, WA (US)

(73) Assignee: Westech Aerosol Corp., Port Orchard, WA (US)

( * ) Notice: Subject to any disclaimer, the term of this patent is extended or adjusted under 35 U.S.C. 154(b) by 804 days.

(21) Appl. No.: 10/979,575

(22) Filed: Nov. 2, 2004

Related U.S. Application Data

(63) Continuation-in-part of application No. 10/132,620, filed on Apr. 25, 2002, now abandoned.

(60) Provisional application No. 60/287,671, filed on Apr. 30, 2001.

(51) Int. Cl.
  *B01F 3/04* (2006.01)
  *C08K 5/01* (2006.01)
  *C09J 11/02* (2006.01)
  *C08J 9/12* (2006.01)
  *C08J 9/14* (2006.01)
  *C09J 5/08* (2006.01)

(52) U.S. Cl. .................... 516/8; 516/1; 524/484; 524/903; 521/50; 521/72; 521/97; 521/910; 523/167; 523/218; 106/205.01

(58) Field of Classification Search ............ 516/1, 516/8; 524/484, 903; 521/50, 72, 97, 910; 523/167, 218; 106/205.01
See application file for complete search history.

(56) References Cited

U.S. PATENT DOCUMENTS

| | | | |
|---|---|---|---|
| 3,791,983 A | | 2/1974 | Maierson |
| 4,301,119 A | * | 11/1981 | Cobbs et al. ......... 261/DIG. 26 |
| 4,380,505 A | | 4/1983 | Wittenhorst |
| 5,159,894 A | * | 11/1992 | Saidman et al. ...... 261/DIG. 26 |
| 5,444,112 A | | 8/1995 | Carnahan |
| 5,480,925 A | | 1/1996 | Masuzaki et al. |
| 5,711,484 A | | 1/1998 | Blette et al. |

OTHER PUBLICATIONS

The Science and technology of Aerosol Packaging, Edited by J. Sciarra & L. Stoller (John Wiley & Sons, Inc., NY, NY, copyright 1974) pp. 137-141 (Feb. 1975).*

P. A. Sanders, Principles of Aerosol Technology, (Van Nostrand Reinhold Company, NY, NY, copyright 1970) pp. 28-33, (May 1974).*

* cited by examiner

*Primary Examiner*—Daniel S Metzmaier
(74) *Attorney, Agent, or Firm*—Innovative IP, LLC; Sandra M. Sovinski, Esq.

(57) ABSTRACT

A cannister-based, high solids, low and non-VOC aerosol adhesive and canister based system. The aerosol adhesive typically includes a high solids polymeric base, a hexane or cyclohexane and acetone solvent mixture and a compressed gas dissolved within the solvent. The compressed gas typically includes carbon dioxide, nitrogen, nitrous oxide and air. The aerosol adhesive is adapted to be filled into a cannister including a hose connected to the canister and a spray gun connected to the hose. The system typically includes high solids with a high viscosity. Thus the canister typically maintains high pressures up to 350 psi, but typically at 260 psi while maintaining 325 psi at 130° F., to deliver effective spray patterns.

28 Claims, No Drawings

AEROSOL ADHESIVE AND CANISTER-BASED AEROSOL ADHESIVE SYSTEM

This application is a Continuation-In-Part of U.S. Utility patent application Ser. No. 10/132,620, filed on Apr. 25, 2002, now abandoned, and entitled, "Aerosol Adhesive and Canister-Based Aerosol Adhesive System". Therefore, priority based on U.S. Provisional Patent Application Ser. No. 60/287,671, filed on Apr. 30, 2001, and entitled "Cannister-Based Aerosol Adhesive" is also claimed.

The present invention relates generally to the field of aerosols and aerosol adhesives and more particularly to canister-based aerosol adhesives.

BACKGROUND

Aerosols have a variety of uses in modern society. Consumers typically use aerosols in convenient size aerosol dispensers. There are also industrial applications that use larger aerosol dispensers, on the order of five gallons, that use hose and gun configurations to dispense the aerosols. In particular, aerosol adhesives are used in large dispensers in order to apply adhesive to bond various surfaces. Adhesives can come in various forms such as natural, organic, vegetable and synthetic. There are several classes of polymeric based synthetic adhesives such as thermosetting adhesives, thermoplastic resins and elastomeric adhesives to name a few. Typically aerosols and aerosol adhesives emit volatile organic compounds (VOCs) during their use.

In many localities, VOCs are regulated. VOC regulations govern both the solvent which the polymer is dissolved and the propellant. Most organic solvents are VOCs. Since aerosol adhesives emit VOCs in their use, aerosol adhesives can fall within these regulations. Regulations can differ depending on the locality, the compounds used and the size of the dispensing container. The compounds typically of concern are the propellants that are primarily contain hydrocarbons and dimethyl ether. The hydrocarbons typically include propane, butane and isobutane, which are all typically flammable. These propellant gases are widely used in aerosols. These hydrocarbons also typically act as a solvent when compressed because they become liquids. They are referred to as liquified gases. Other propellants, which are also liquified gases include chlorofluorocarbons (CFCs), hydrofluorocarbons (HFCs) and hydrochlorofluorocarbons (HCFCs). A variety of other compressible gases such as carbon dioxide, nitrous oxide, nitrogen and air may be used as propellants. These gases are referred to as compressible gases because at normal working pressures for aerosol formulators they do not form liquids.

As mentioned, the regulations can differ. For example, in California, there are two levels for regulating VOC emissions. One level is the State of California, and the other is the local air districts. Many of the local air districts do not classify aerosol containers as aerosol if they weigh more than one pound, rather, they classify them as bulk or liquid contact adhesives. The VOC regulations for bulk or liquid contact adhesives are typically much more stringent than the VOC regulations for aerosols. Therefore, many manufacturers have gone to manufacturing water based products because they can not manufacture compliant adhesive formulation.

Finally, a typical formula for aerosol adhesives is:

28 lb. of adhesive (30 percent solids—12 percent SIS rubber and 18 percent resin)

12 lb. of hydrocarbon propellant (50 percent propane and 50 percent isobutane)

The solvent system typically used to dissolve the rubber and resin can include methylene chloride. In this formulation, typically, the adhesive concentrate is prepared by the 28 lbs of the rubber resin mixture being dissolved in a solvent, which is then pumped into a large aerosol cylinder. In addition, 12 pounds of propellant (a blend of propane and isobutane) is typically added. This adhesive has the desired characteristics but, however, it is high in VOC due to the propellent. Furthermore, it has toxicity problems due to the large amount of chlorinated solvent also typically included. Typically, in aerosol adhesives the solvent chosen from dissolving the adhesive is a chlorinated solvent. The solvent must dissolve all of the components of the adhesive. One necessary ability of the solvent is the ability to dissolve the polymer and the resin. Another necessary property of the solvent is that it should evaporate quickly. These properties allow the end user to adhere the surfaces as quickly as possible. Typically, the chlorinated solvents are methylene chloride and bromo-propane. Although these compounds can be used, there are certain health hazards associated with them.

Furthermore, in general, can-based systems cannot maintain high pressures. Can-based systems typically maintain 50 psi. In additions, typical regulations require that cans maintain a pressure of 200 psi at a temperature of 130° F. Therefore, high solids and high viscosity formulations and blends typically cannot be effectively sprayed from cans having such low pressures.

SUMMARY

In general, the invention features an aerosol adhesive and canister based aerosol adhesive system having low VOC emissions and having a spray pattern and high viscosity suitable for aerosol adhesive applications. The cannister allows high pressure to be maintained to produce effective spray patterns of a high viscosity, high solids adhesive blend for a variety of applications.

In general, in one aspect, the invention features an aerosol adhesive blend used for spray applications, including a solvent mixture, chosen to have volatility characteristics for producing a specific spray pattern, a polymeric base in the solvent mixture and a compressed gas dissolved in the solvent mixture.

In one implementation, the polymeric base includes styrene block polymers.

In another implementation, the polymeric base includes styrene butadiene polymers.

In another implementation, the polymeric base includes neoprene.

In another implementation, the polymeric base is high solids.

In another implementation, the high solids concentrate is approximately 20 percent of the blend.

In another implementation, the high solids concentrate is greater than 20 percent.

In another implementation, the viscosity of the adhesive is about 100 to 1000 centipoise.

In another implementation, the viscosity of the adhesive is about 1000 centipoise.

In another implementation, the viscosity of the adhesive is greater than 1000 centipoise.

In another implementation, the solvent mixture comprises a blend of hexane and acetone.

In still another implementation, the solvent mixture includes a solvent selected from the group consisting of hexane and cyclohexane.

In another implementation, hexane is used in the blend where an application requires a spray pattern that has a higher volatility as compared to cyclohexane.

In yet another implementation, cyclohexane is used in the blend where an application requires a spray pattern that has a lower volatility as compared to hexane.

In another implementation, hexane is used in the blend where an application requires direct contact with the aerosol adhesive and polystyrene.

In another implementation, the compressed gas is carbon dioxide.

In still another implementation, the compressed gas is nitrous oxide.

In yet another implementation, the compressed gas is nitrogen.

In another implementation, the compressed gas is air.

In another implementation, the aerosol adhesive further includes resins.

In another implementation, the resins are tackifying resins.

In another implementation, the aerosol adhesive further includes antioxidants.

In another implementation, the polymeric base is dissolved in the solvent mixture.

In another implementation, the polymeric base is suspended in the solvent mixture.

In another aspect, the invention features aerosol adhesive canister system, including a canister, a hose connected to the canister, a spray gun connected to the hose and an aerosol adhesive held within the canister, the aerosol adhesive including a thermoplastic polymeric base, a hexane and acetone solvent system, and a propellant gas dissolved in the solvent system.

In another aspect, the invention features an aerosol adhesive blend for use in spray applications, including a thermoplastic polymer having a relative concentration of about 20 percent thereby giving the blend a viscosity of about 1000 centipoise, a non-chlorinated solvent mixture, chosen to provide a spray pattern to support the polymer for both applications that require dry times of varying lengths and a propellant gas mixed in the blend for pressurization to pressures to be maintained in a cannister.

In one implementation, the non-chlorinated solvent mixture comprises hexane for use in applications requiring a dry time shorter relative to the dry time for cyclohexane.

In another implementation, the non-chlorinated solvent mixture comprises acetone.

In another implementation, the non-chlorinated solvent mixture comprises cyclohexane for use in applications requiring a dry time longer relative to the dry time for hexane.

In another implementation, the propellant gas and the a thermoplastic polymer are dissolved in the solvent mixture.

In still another aspect, the invention features an aerosol adhesive blend, including a polymeric base blend dissolved in a solvent and a propellant gas dissolved in the solvent with the polymeric base.

In one implementation, the solvent is a hexane acetone blend.

In another implementation, the compressed gas is selected from the group consisting of carbon dioxide, nitrogen, nitrous oxide and air.

In another aspect, the invention features an aerosol adhesive canister system, including a canister, a hose connected to the canister, a spray gun connected to the hose and an aerosol adhesive held within the canister, the aerosol adhesive including a thermoplastic polymeric base in a solvent mixture including acetone and at least one of hexane and cyclohexane and a propellant gas dissolved in the solvent system.

In one implementation, the canister is pressurized in the canister in a range of about 150-350 psi.

In another implementation, the canister is pressurized in the canister to about 200 psi.

In another implementation, the canister is pressurized in the canister in a range of about 160-200 psi.

In another implementation, the relative solids concentration is about 20-50%.

In another implementation, the relative solvent concentration is about 50-80%.

In another implementation, the relative solids concentration is 28% and the relative solvent concentration is about 72%.

In another implementation, the solvent mixture includes about 50% acetone and 50% hexane.

In another implementation, the solvent mixture includes about 50% acetone and 50% cyclohexane.

In another implementation, the solvent mixture includes about 5% acetone and 95% hexane.

In another implementation, the solvent mixture includes about 5% acetone and 95% cyclohexane.

In another implementation, the solvent mixture includes about 100% hexane.

In still another implementation, the solvent mixture includes about 100% cyclohexane.

In still another implementation, the solvent mixture includes about 95% acetone and 5% cyclohexane.

In yet another implementation, the system includes a hydrocarbon propellant held within the canister.

In another implementation, the hydrocarbon propellant is chosen from the group consisting of: propane, isobutane and a propane/isobutane blend.

One advantage of the invention is that the volatile organic compounds level is lowered while maintaining a high quality aerosol adhesive blend.

Another advantage is that it provides a high solids adhesive solution propelled by compressed gases.

Another advantage of the invention is that the cannister-based system can maintain higher pressures as compared to can-based systems.

Another advantage is that the high solids adhesive solution includes characteristics that make the solution behave like a lower solids adhesive. Therefore, the same spray equipment can be used when applying this low VOC adhesive as when applying a high VOC adhesive. A user using a cannister containing the high solids adhesive solution who currently is spraying a high VOC adhesive, can simply change out the existing gun and hose from a high VOC canister and attach it to the low VOC cylinder or canister.

Another advantage of the invention is that the canister-based system can maintain and spray a high solids, high viscosity, but low solvent and thus low VOC blend.

Another advantage is that the aerosol adhesive the solvent which solvent evaporates almost as quickly as the high toxicity chlorinated solvents such as methylene chloride. This advantage allows for the user to adhere the substrates quickly.

Another advantage in utilizing the high solids formulation is due to the fact there is less solvent in the adhesive film to evaporate prior to bonding.

Another advantage is that solvents are relatively non toxic.

Another advantage is that the compressed gases ($CO_2$, $N2$) used in the formulation are nonflammable.

A further advantage is that compressed gas used in the formulation can match up the spray pattern of a liquified gases. Typically, liquified gases dissolve in the concentrate. When sprayed out, the "pressure out" side of the aerosol can drop and the liquified gases goes from a liquid to a vapor. This transition helps break up the spray pattern to its desired effect.

Typically, the viscosity of the blend is approximately 1000 centipoise.

Another advantage is that the absorption rate of hexane acetone into $CO_2$ allows the mixture to work as a reliable non-flammable non-VOC propellant to move the rubber and resins in a manner that performs like a high solvent high VOC product without the inherent damage to the environment.

Another advantage is that once applied, the rate of evaporation of the formulation is greater than water based systems. This allows the applicator to assemble the adherents together faster using the formulation.

Other objects, advantages and capabilities of the invention will become apparent from the following description taken in conjunction with the accompanying drawings showing the preferred embodiment of the invention.

DETAILED DESCRIPTION

In general, embodiments are introduced that include an aerosol adhesive, including a polymeric base, a solvent mixture and a compressed gas that are adapted to be filled into a cannister including a hose connected to the canister and a spray gun connected to the hose. The cannister can typically be highly pressurized thereby providing spray patterns virtually identical to those spray patterns of liquified gases in the prior art. Furthermore, the cannister-based system can maintain and spray a high solids, low solvent blend resulting in desired web patterns for various applications. In addition to the advantages discussed above, the primary advantage of the cannister using pressurized gas is to maintain and spray high viscosity blends with effective spray patterns, while reducing solvent content.

In one embodiment, a large aerosol container of approximately 27 lb. contains high styrene block polymers and resins solutions in an acetone/hexane blend in a solvent blend. The overall percent of solids in the adhesive system is high. This system is refer to as a high solid systems. The more rubber and resin that is in the dissolved in the solvent (concentrate) the lower the percentage of solvent. This formulation therefore typically leads to the lower VOC content. Generally, in aerosol adhesives the solids of the concentrate is approximately 20 percent. It is usually difficult to increase the solids due to the fact that the viscosity of the concentrate increases exponentially with increasing polymer concentration. In this embodiment, the blend is solvent based and has unusually low VOC emissions due to its high solids in the concentrate. Additionally, in aerosol form, it has unusually low VOC emissions due to using compressed gas as the propellant.

The acetone/hexane blend typically evaporates quickly (almost as quickly as the methylene chloride) and the hexane/acetone and polymer selections allows for low viscosity solution. Typically, the solvent composition affects the polymer viscosity. Polymers are chosen that give the lowest viscosity in this solvent system. Typically, higher styrene block polymers give lower viscosity solutions that lower styrene block polymers. Typically, the viscosity of the blend is approximately 1000 centipoise.

In another embodiment, cyclohexane can be used in the place of hexane. Typically, hexane and cyclohexane have similar properties that allow the two to be interchanged in separate embodiments. Although hexane offers several advantages, cyclohexane offers different advantages. Typically, several Federal and State laws consider hexane a Hazardous Air Pollutant (HAP). Therefore, hexane can often be the subject of regulation. Cyclohexane is typically not listed as a HAP. Therefore, by using cyclohexane, environmental concerns are reduced. Furthermore, additional differences between hexane and cyclohexane offer differing advantages depending on the application. Cyclohexane is typically less volatile than hexane and therefore evaporates slower than hexane. Therefore, solvent blends incorporating hexane "flashes off" more while being sprayed than the solvent blends using hexane. Therefore, blends with cyclohexane remain to "wet out" the adhesive more than blends with hexane on a sprayed surface. These features typically lead to a less pronounced web pattern when spraying the blends with cyclohexane. The webs produced are typically flatter and broader on the sprayed surface. Therefore, the advantages of cyclohexane for certain applications are an apparent increase in the effective sprayed area, and an increased tack on the sprayed surface. The increased tack is desirable when it is achieved without reduction of the bond strength and a non-modified adhesive strength. Typically, the flat web is due to the slow evaporation rate of the cyclohexane compared to the hexane. The slow evaporation of the cyclohexane typically also affects the adhesive by increasing the elongation under stress, resulting in the blend being more rubbery or stretchy, and thus tackier.

It is understood that the slow evaporation is not advantageous in applications that require faster evaporation. For example, the slow evaporation delays the next step in assembly processes. Furthermore, cyclohexane tends to attack polystyrene more than hexane. Therefore, hexane is typically more advantageous than cyclohexane in applications that involve direct contact of the blend with polystyrene.

By spraying out high viscosity blends using compressed gases yields lowered VOC emissions. By compressing a styrene adhesive with $CO_2$ produces a spray pattern that is very comparable with a low solid solution adhesive which utilizes liquified gases such as propane and butane as a propellent to spray the adhesive out of an aerosol. This compressed gas implementation produces a fine, webbing spray pattern. $CO_2$ has the most favorable properties for being used as a compressed gas propellant because it is non-flammable, is readily soluble in many solvents, occurs naturally and is relatively inert. The solubility of the $CO_2$ in many solvents is important because of the fact that it helps in the pressure recover when the aerosol can is emptied, by the $CO_2$ coming back into gas form. Other gases can also be used in the formulation that have similar desirable properties as the $CO_2$. Such gases can include, but are not limited to, nitrous oxide, nitrogen and air.

Acetone is well-known for its pronounced ability to dissolve both $CO_2$ and $N_2O$. The solubility of $CO_2$ exceeds 12.1% in acetone at 100 psi and 25° C. (77° F.). At ambient temperatures, acetone exists mostly as $CH_3$—CO—$CH_3$, but to some extent as the enol form $CH_3$—C(OH)═$CH_2$. Based on the very moderate solubility of $CO_2$ in the simple alcohols, it would appear that the usual keto-structure in the one that promotes the extraordinary solubility of $CO_2$ in acetone. The slightly positively charged carbon atom in $CO_2$ the is electrically attracted to the negatively charged atom of the acetone. By adding a positive factor to that oxygen atom (making the resonate enol form), the negativity is either lost or diminished and the solubility of $CO_2$ is reduced. Consequently, having an enol in certain formulations changes the pH values of the formulations, due to the enol forming an enolate by losing a proton.

In an embodiment, thermoplastic rubbers are used as the polymeric base. These rubbers are used to make contact and pressure sensitive adhesives. Contact adhesives are adhesives that are coated onto two or more different surfaces to be adhered together. Typically the surfaces are coated with the adhesive, then the two surfaces are pressed together. A common example of this is neoprene solvent counter top adhesive.

The adhesive is applied to the laminate and to the particle board in which the laminate is to be mounted. The solvent is allowed to evaporate leaving behind the adhesive solids coated onto the laminate and the particle board. The two substrates are brought into contact with each other and bonding occurs. A pressure sensitive adhesive is an adhesive which is applied to one surface as a substrate and then this adhesive coated substrate is applied to a second surface. An example of this is a piece of tape. The tape contains the adhesive on a substrate which can then be applied to any surface with pressure.

Generally, to manufacture an aerosol adhesive, there are three basic polymer types used. They are styrene block polymers, styrene butadiene polymers and neoprene. Typically, styrene block polymers are used in the manufacture of aerosol adhesives. As described above the aerosol adhesives are primarily solvent based. Solvent based aerosol adhesive consist primarily of propellants, a mixture of solvents and the polymeric material.

In addition to the polymeric base there are tackifying resins. The tackifying resins may make the polymer sticky (as in pressure sensitive applications), give the polymer its contactability, or provide both properties. In addition, most aerosol adhesives contain some antioxidants which protect the adhesive from oxidation.

Thermoplastic rubbers are used because they can be formulated with a wide degree of properties. Additionally, when compared to other polymer types thermoplastic rubbers give relatively low viscosity solutions. In aerosol formations, low viscosity solutions are much easier to spray out of an aerosol can than high viscosity solutions. The structure of thermoplastic rubbers are now described. On the ends of linear molecule is a block of polystyrene. This blocks are referred to as end blocks. The middle block is either polybutadiene, polyisoprene, polyethylene/butylene. The mid block is elastomeric and rubbery. The end block is hard and what gives the polymer its strength.

The unique structure of thermoplastic block copolymers offers possibilities to formulate with resins that associate with either the elastomeric mid-block or the polystyrene domains. This powerful formulating tool, supplemented by the use of plasticizer, fillers and antioxidants, allows the formulator to modify a wide range of adhesive performance properties such as tack, cohesive strength, holding power, stiffness and temperature resistance. In solvent based systems thermoplastic rubbers have the advantages of low viscosity, high solids contents and short dissolving times in a wide range of solvents.

The solubility of the propellent is important. As the aerosol can is emptied, the dissolve propellant boils from the concentrate to the head space of the aerosol can. That is the propellant goes from being dissolve in the concentrate to the empty space on top of the concentrate. Typically, the more propellent which can be absorbed into the concentrate the less of a pressure drop that will occur when the can is emptied. For example, the hydrocarbon propellants liquefy and mix with low solubility solvents, hydrocarbon solvents, and when the aerosol can is emptied, the propellent goes from a liquid to a vapor inside the can. Consequently, the pressure in the can is relatively constant.

The compressed gases such as nitrogen, nitrous oxide, and compressed air all seem to have low solubility in most solvents. However, the solubility of $CO_2$ in acetone is 12.08 percent by weight and the solubility of hexane is approximately 3.32 percent. The higher solubility of $CO_2$ than the other compressed gases leads to less of a pressure drop in an aerosol can when emptied.

In general, the canister and the canister based systems can maintain high pressures that allow effective spraying of the high viscosity adhesive blends described herein. Typically canisters can maintain pressures up to 350 psi. In typical implementation, the canisters are filled with the blends and pressurized to pressures ranging from 160-200 psi. These pressures are typically maintained at temperatures ranging from 130-150° F. Furthermore, typical relative solids concentration can range from 20-50%. The relative solvent concentration can range from 50-80%. In another embodiment, the cannister can be pressurized to about 260 psi as a working pressure and can be maintained at 325 psi at 130° F. In addition, as described above, the solvent blend typically includes a mix of acetone and hexane or acetone and cyclohexane. The relative concentrations of the solvents can be in the range of 50% acetone and 50% hexane or cyclohexane to 0% acetone and 100% hexane or cyclohexane. Other relative concentrations can typically include 5% acetone and 95% hexane or cyclohexane and 48% acetone and 52% hexane or cyclohexane. In addition, often times a small amount of propellant is added to the canister in addition to the inert gases described herein. In a typical embodiment, the small amount of propellant is propane, isobutane or a propane/isobutane blend.

Example 1

To a paddle blade mixer is added:

140 lb. of a solution of (50 percent hexane and 50 percent acetone)

42 lb. of Dexco 4411 (an SIS block polymer with 44 percent styrene)

28 lb. of Exxon Chemical 5637 (a resin which provides contactability of the isoprene mid block)

200 grams of Mayzo 10 (a phenolic antioxidant)

50 grams of Naugard P (a phosphite antioxidant)

The solution is mixed until the rubber and resin is dissolved. The adhesive mixture was pumped into a large aerosol container of approximately 22.13 Liters in size and then charged with $CO_2$. The container can be an Amtrol non-refillable cylinder fitted with a dip tube. The large aerosol container is shaken so that the solvent could absorb the $CO_2$ and more $CO_2$ is added to the container. The final pressure in the container is 120 psi. The container was fitted with Teleflex T1167-04 hose. The hose length is 6 foot. The hose is ¼ inch in internal diameter. Additionally, the hose is constructed of steel braid and was thought to be Teflon lined. Attached to the hose was spray gun and inserted into the gun was a spraying tip. A GRACO flex airless spray gun is used. A Spraying Systems 9501 brass tip is used. The aerosol composition sprayed a fan pattern of approximately 6-8 inches. The spray pattern and properties of the adhesive when sprayed is similar to a high VOC aerosol formulation.

Example 2

The example is the same as in example 1 only that a 12 foot hose is used. The spray pattern is identical to the one using a 6 foot hose.

Example 3

The solution is prepared as in example 1 only that a 6.95 Liter cylinder from Amtrol was used. The pattern was exactly the same as spraying out of the larger cylinder.

Example 4

Same as example 1 only the canister was charged to 300 PSI. The canister sprayed out exactly the same.

Example 5

The solution solids solutions was increased to 40 percent and the same filling procedure was used as in example 1. The difference is that the solution sprayed out heavier than the current high VOC product. Producing a high solids low viscosity solution produces a product which matches up to the high VOC product.

Example 6

25 lbs of the solids/solvent mix is added to a canister with 2-4 pounds of a hydrocarbon propellant such as propane, isobutane and a propane/isobutane blend. The canister is pressurized to 200 psi with nitrogen.

Example 7

In this example, a chlorinated solvent is used. 25 lbs of the solids/solvent mix is added to the canister with 12½ pounds of the hydrocarbon propellant. The canister is pressurized to 200 psi.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An aerosol adhesive canister system, comprising:
   a gas cylinder canister;
   a hose connected to said canister;
   a spray gun connected to said hose;
   a hydrocarbon propellant held within said canister; and
   an aerosol adhesive held within said canister, said aerosol adhesive comprising:
      a solvent mixture selected to have volatility characteristics for producing a specific spray pattern;
      a polymeric base in said solvent mixture; and
      a compressed gas dissolved in said solvent mixture.

2. The system as claimed in claim 1 wherein said compressed gas is pressurized in said canister in a range of about 150-350 psi.

3. The system as claimed in claim 1 wherein said compressed gas is pressurized in said canister to about 200 psi.

4. The system as claimed in claim 1 wherein said compressed gas is pressurized in said canister in a range of about 160-200 psi.

5. The system as claimed in claim 1 wherein the relative solids concentration of said aerosol adhesive is about 20-50% by weight.

6. The system as claimed in claim 5 wherein the relative solvent concentration of said aerosol adhesive is about 50-80% by weight.

7. The system as claimed in claim 1 wherein the relative solids concentration of said aerosol adhesive is 28% by weight and the relative solvent concentration of said aerosol adhesive is about 72% by weight.

8. The system as claimed in claim 1 wherein said solvent mixture includes about 50% acetone and 50% hexane by volume.

9. The system as claimed in claim 1 wherein said solvent mixture includes about 50% acetone and 50% cyclohexane by volume.

10. The system as claimed in claim 1 wherein said solvent mixture includes about 5% acetone and 95% hexane by volume.

11. The system as claimed in claim 1 wherein said solvent mixture includes about 5% acetone and 95% cyclohexane by volume.

12. The system as claimed in claim 1, wherein said solvent mixture includes about 100% hexane.

13. The system as claimed in claim 1, wherein said solvent mixture includes about 100% cyclohexane.

14. The system as claimed in claim 1 wherein the hydrocarbon propellant is chosen from the group consisting of: propane, isobutane and a propane/isobutane blend.

15. The system of claim 1, wherein said polymeric base is selected from the group consisting of one or more styrene block polymer, one or more styrene butadiene polymer, and neoprene.

16. The system of claim 1, wherein said polymeric base is high solids concentrate.

17. The system of claim 16, wherein said high solids concentrate is greater than or equal to 20% of the blend.

18. The system of claim 1, wherein said compressed gas is selected from the group consisting of carbon dioxide, nitrous oxide, nitrogen, and air.

19. The system of claim 1, wherein said status of said polymeric base relative to said solvent mixture is selected from the group consisting of dissolved in said solvent mixture and suspended in said solvent mixture.

20. The system of claim 1, wherein a concentration of said polymeric base is approximately 20% of said aerosol adhesive and wherein said aerosol adhesive has a viscosity of approximately 1000 centipoise.

21. The system of claim 1, wherein said volatility characteristics of said solvent mixture support a plurality of drying time constraints, according to application requirements, and wherein delivery of a consistent application pressure by said canister is facilitated by said dissolved, compressed gas.

22. The system of claim 21, wherein said solvent mixture is non-chlorinated and comprises hexane, and wherein said application requires a minimized drying time.

23. The system of claim 21, wherein said solvent mixture is non-chlorinated and comprises cyclohexane, and wherein said application requires a maximized drying time.

24. The system of claim 1, wherein said solvent mixture comprises acetone.

25. The system of claim 1, wherein said polymeric base is dissolved in said solvent mixture with said compressed gas.

26. The system of claim 1, wherein said compressed gas is selected from the group consisting of carbon dioxide, nitrogen, nitrous oxide, and air.

27. The system of claim 1, wherein said aerosol adhesive is a high solids solution propelled by compressed gases.

28. A spray adhesive canister system, comprising:
   a combination of compressed inert gas and liquefied propellant usable together in said canister, wherein the relative volume and concentration of liquefied propellant is minimal relative to the relative volume and concentration of compressed inert gas,
   wherein said combination and relative concentrations of compressed inert gas and liquefied propellant enables said spray adhesive canister system to maintain a consistent spray delivery pressure and a consistent spray coarseness irrespective of the volume of spray adhesive remaining to be dispensed from said canister, and wherein said spray adhesive is a high solids, high viscosity, low solvent and low voc blend.

* * * * *